US007478489B2

(12) United States Patent
Anderson et al.

(10) Patent No.: US 7,478,489 B2
(45) Date of Patent: Jan. 20, 2009

(54) CONTROL SYSTEM FOR AN ELECTRONIC FLOAT FEATURE FOR A LOADER

(75) Inventors: Eric R Anderson, Galena, IL (US); Jahmy Hindman, Rickardsville, IA (US); Joshua D Graeve, Epworth, IA (US)

(73) Assignee: Deere & Company, Moline, IL (US)

( * ) Notice: Subject to any disclaimer, the term of this patent is extended or adjusted under 35 U.S.C. 154(b) by 266 days.

(21) Appl. No.: 11/444,988

(22) Filed: Jun. 1, 2006

(65) Prior Publication Data

US 2007/0277405 A1 Dec. 6, 2007

(51) Int. Cl.
*G05D 1/02* (2006.01)

(52) U.S. Cl. ............................ 37/348; 37/382; 37/414; 414/699; 701/50; 60/413

(58) Field of Classification Search .................. 37/348, 37/382, 414, 234; 701/50; 172/2-4.5; 414/699
See application file for complete search history.

(56) References Cited

U.S. PATENT DOCUMENTS 2,780,063 A * 2/1957 Bacchi
3,186,305 A 6/1965 Lorimer
3,864,911 A 2/1975 Gellatly et al.
4,046,270 A * 9/1977 Baron et al. ................ 414/694
4,342,164 A 8/1982 Claassen
4,698,761 A 10/1987 Cooper et al.
4,852,660 A * 8/1989 Leidinger et al. ........... 172/795
4,928,487 A * 5/1990 Nikolaus ..................... 60/414
4,961,316 A * 10/1990 Corke et al. .................. 60/431
5,048,292 A * 9/1991 Kubik ......................... 60/413
5,179,836 A * 1/1993 Dantlgraber ................. 60/430
5,189,940 A * 3/1993 Hosseini et al. ............... 91/361
5,426,874 A * 6/1995 Nakata et al. ................. 37/348
5,469,694 A * 11/1995 Panousheck et al. ...... 56/10.2 E
5,778,669 A * 7/1998 Kubik ......................... 60/413
5,924,516 A * 7/1999 Sagaser et al. .............. 180/333
6,584,769 B1 * 7/2003 Bruun ......................... 60/414
6,640,468 B2 * 11/2003 Menze ........................ 37/234
6,886,332 B2 * 5/2005 Kubinski et al. .............. 60/475
6,938,414 B1 * 9/2005 Bruun ......................... 60/414
2004/0245732 A1 12/2004 Kotulla et al.
2007/0006491 A1 * 1/2007 Loku et al. ..................... 37/348
2007/0056277 A1 * 3/2007 Mizoguchi et al. ............ 60/413

* cited by examiner

*Primary Examiner*—Thomas A Beach
*Assistant Examiner*—Matthew R Buck
(74) *Attorney, Agent, or Firm*—Baker & Daniels LLP

(57) ABSTRACT

The present invention is related to a loader of a construction apparatus such as front-end wheel loader or an agricultural tractor. Specifically, the present invention is related to a control system for a loader.

19 Claims, 4 Drawing Sheets

CONTROL SYSTEM FOR AN ELECTRONIC FLOAT FEATURE FOR A LOADER

FIELD OF THE INVENTION

The present invention is related to a loader of a construction apparatus such as front-end wheel loader or an agricultural tractor. Specifically, the present invention is related to a control system for a loader.

BACKGROUND OF THE INVENTION

Typically, conventional front-end loaders for construction machinery such as wheel loaders and agricultural tractor loaders may be articulated by a hydraulic system. Loaders may be added to existing tractors or may be the principal implement of a track driven or wheel loader. Typically, loaders include a large bucket to scoop material such as coal, dirt, and stone and load the material into a trailer or dump truck. Some loaders may also be used to dig holes.

Most loader hydraulic systems include a hydraulic pump and at least one hydraulic cylinder adapted to articulate a loader boom and/or a bucket. An operator may use any of a plurality of controls located in a cab of the machinery or elsewhere to control the hydraulic system to articulate loader boom and bucket assembly. Some common features of the control system for the boom and bucket assembly include raising and lowering the boom and rotating the bucket fore and aft to load or dump the bucket. Another common feature of the control system is a float feature. The float feature allows the bucket to "float" on the ground for backgrading or leveling operations, for example leveling a gravel-based parking lot. When the bucket is floated, only the weight of the boom and bucket assembly is applied to the ground. This allows the bucket to float over the material being leveled and create a smooth, even leveled area free of large depressions or bumps.

SUMMARY OF THE INVENTION

One embodiment of the present invention includes a control system for a loader on a construction apparatus including a frame and a hydraulic pump, the loader including a boom, a bucket, and a hydraulic cylinder including at least three chambers, the cylinder operably coupled between the boom and the frame, the control system including a variable input configured to accept an operator instruction to one of raise, lower, and float the bucket, the variable input configured to output a signal corresponding to the operator instruction, a control valve, an accumulator adapted to receive and store pressurized hydraulic fluid from at least one of three chambers of the hydraulic cylinder when the boom is lowered and supply pressurized hydraulic fluid to at least one of the three chambers of the hydraulic cylinder when the bucket is raised, a plurality of pressure sensors adapted to measure a hydraulic pressure in each the three chambers of the hydraulic cylinder and output a plurality of corresponding signals, and a controller configured to receive the signal from the variable input and control the control valve and the hydraulic pump to one of raise, lower, and float the bucket based on the signal from the variable input, the controller further configured to determine a first force applied to one of the chambers of the cylinder by the accumulator and control the pump and the plurality of control valves to supply pressurized hydraulic fluid to another chamber of the cylinder to overcome the first force when the float instruction is received by the variable input.

Another embodiment of the present invention includes a method of controlling a loader of a construction apparatus including a frame, a hydraulic pump, a hydraulic cylinder including a plurality of chambers, a plurality of pressure sensors, an accumulator, a control valve, an input, a bucket, and a boom operably coupled between the bucket and the frame, the method including the steps of receiving operator input corresponding to a command to float the bucket, measuring a pressure in each of the chambers of the hydraulic cylinder, calculating a first force of the hydraulic cylinder acting on the boom to move the boom upward, and controlling the hydraulic pump and the control valve to supply hydraulic pressure to at least one of the chambers of the hydraulic cylinder to prevent the boom from moving upward.

BRIEF DESCRIPTION OF FIGS.

The detailed description of the drawings particularly refers to the accompanying figures in which.

DETAILED DESCRIPTION OF THE INVENTION

Figure 1:
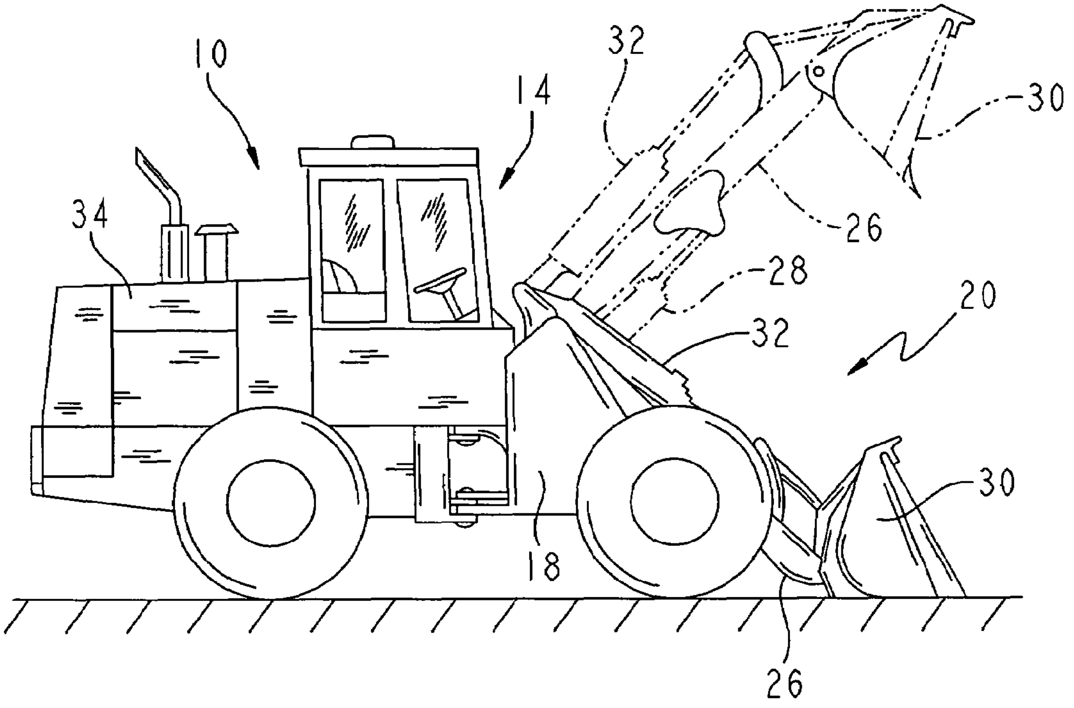
FIG. 1 is a profile view of a front-end wheel loader with the articulated boom and bucket shown in phantom.

Referring initially to FIG. 1, one embodiment of a wheel loader 10 is shown. Wheel loader 10 includes a motor 34, a cab 14, a frame 18, and a boom assembly 20. Boom assembly 20 includes a boom 26, a boom cylinder 28, a bucket 30, and a bucket cylinder 32. Boom 26 is pivotally coupled to frame 18 and may be raised and lowered by extending or retracting boom cylinder 28. Bucket 30 is pivotally coupled to boom 26 and may be articulated by extending or retracting bucket cylinder 32. Wheel loader 10 and specifically boom assembly 20 are controlled by an operator and a plurality of controls located in cab 14. In this embodiment, boom assembly 20 includes a tool carrier style linkage, however any suitable linkage such as a Z-bar linkage may be used. An example of operator controls is discussed below.

Figure 2:
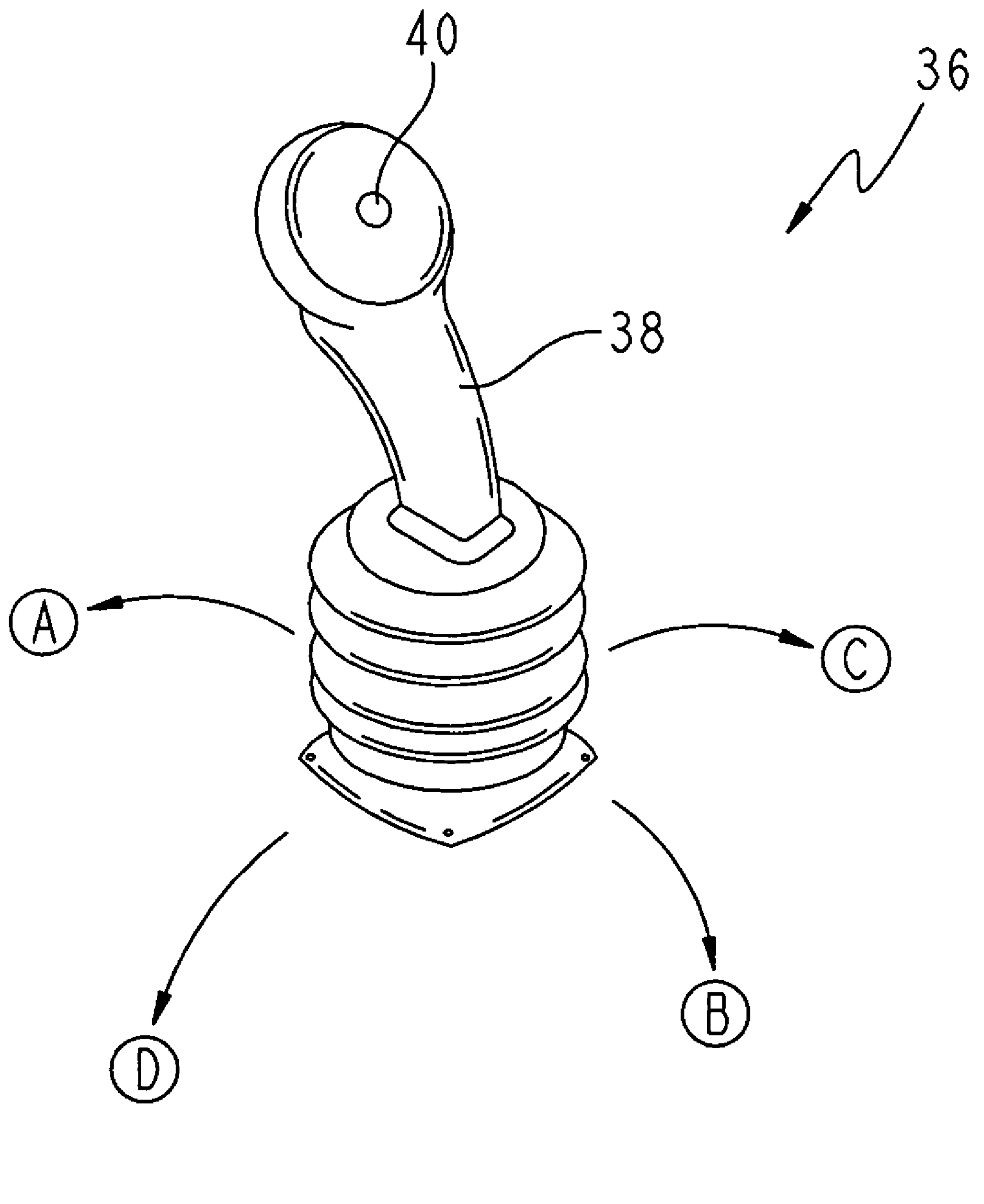
FIG. 2 is a perspective view of one embodiment of operator input device.

Referring now to FIG. 2, one embodiment of an operator input or control 36 is shown. Input 36 may be located in cab 14 of wheel loader 10 or any other suitable location. In this embodiment, input 36 includes a joystick 38 and a selector 40. Joystick 38 is movable in four directions (A, B, C, D). Selector 40 may be a push button or any other suitable input that may be used by the operator to switch between or select one of the hydraulically actuated functions of wheel loader 10. As described in more detail below, the operator may select any one of a plurality of hydraulically actuated functions of wheel loader 10 that will then be controlled by joystick 38.

Figure 3:
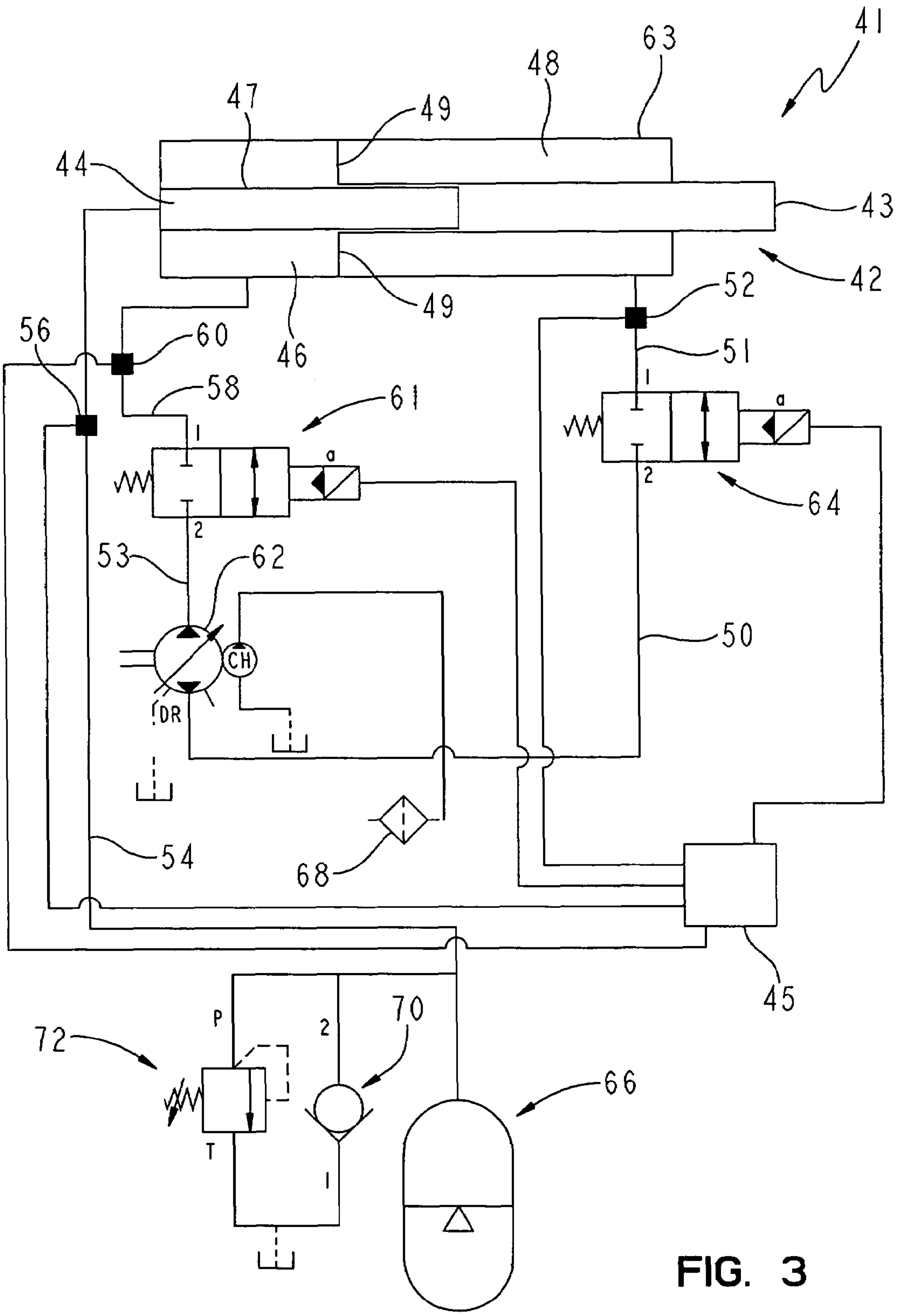
FIG. 3 is a schematic view of one embodiment of the control system of the present invention.

Referring now to FIG. 3, a schematic view of one embodiment of the hydraulic system of the present invention is shown. Hydraulic system 41, shown in FIG. 3, may be implemented in a front end wheel loader such as loader 10 as shown in FIG. 1 or any other suitable piece of construction machinery having a loader. Hydraulic system 41 includes three chambered boom cylinder 42, hydraulic pump 62, control valves 61, 64, pressure sensors 52, 56, 60, accumulator 66, and controller 45. Boom cylinder 42 is one example of a three chambered cylinder that may be used as boom cylinder 28 of loader 10 as shown in FIG. 1, however any suitable three chambered cylinder may be used.

Three chambered boom cylinder 42 includes housing 63, piston 43, flange 49, internal sleeve 47, and first, second, and third chambers 44, 46, and 48. Flange 49 extends outwardly from piston 43 and forms a seal around housing 63 to separate second chamber 46 from third chamber 48. Flange 49 separates second chamber 46 from third chamber 48. First chamber 44 is formed by internal sleeve 47 and piston 43. First chamber 44 is coupled to line 54 and is not in fluid communication with either second chamber 46 or third chamber 48. Hydraulic line 54 is coupled between accumulator 66 and first chamber 44. When boom cylinder 42 is retracted, i.e. boom 26 is lowered, hydraulic fluid flows out of second chamber 46 through line 58 while simultaneously, hydraulic fluid is pulled into third chamber 48 by suction created by flange 49. At the same time, hydraulic fluid in first chamber 44 is compressed or pressurized by piston 43 and pushed through line 54 to accumulator 66. The pressurized fluid stored by accumulator 66 provides a positive or extending force on the lower portion of piston 43 present in first chamber 44. To extend piston 43, pump 62 provides pressurized hydraulic fluid to second chamber 46 through line 58. This pressurized fluid acts on flange 49 of piston 43 to extend piston 43 out of housing 63. The pressurized hydraulic fluid present in first chamber 44 and accumulator 66 also acts to extend piston 43 thereby reducing the pressure of hydraulic fluid needed in second chamber 46 to extend piston 43.

Pressure sensor 56 is positioned in line 54 to measure the pressure of the hydraulic fluid in first chamber 44 of cylinder 42. Second chamber 46 is coupled to control valve 61 by line 58. Pressure sensor 60 is positioned in line 58 to measure the pressure of the hydraulic fluid in second chamber 46. Third chamber 48 is coupled to control valve 64 by line 51. Pressure sensor 52 is positioned in line 51 to measure the pressure of the hydraulic fluid in third chamber 48. Pressure sensors 52, 56, and 60 provide output signals corresponding the pressure of the respective chamber of cylinder 42 to controller 45 of hydraulic system 41.

Hydraulic pump 62 and control valves 61 and 64 may be controlled by controller 45 to operate cylinder 42. In this embodiment, control valves 61 and 64 are solenoid actuated spring return valves, however any suitable control valve may be used. Hydraulic line 53 couples pump 62 to control valve 61. Pump 62 is also coupled to control valve 64 by hydraulic line 50. Pump 62 receives hydraulic fluid from reservoir 68. An input such as input 36, as shown in FIG. 2, may be coupled to the controller 45 of hydraulic system 41 to control three chambered boom cylinder 42. If a command to raise the boom is received, control valve 61 is opened and pump 62 is actuated to supply pressurized hydraulic fluid to second chamber 46. Boom 26 is raised as a consequence of extending piston 45 out of cylinder 42. At the same time, control valve 64 is opened and pump 62 creates a vacuum to pull hydraulic fluid out of third chamber 48. When piston 43 is extended, pressurized hydraulic fluid flows into second chamber 46 and out of third chamber 48. When a command to lower the boom is received, piston 43 is retracted into cylinder 42. When this occurs, both control valves 61 and 64 are opened and pump 62 provides pressurized hydraulic fluid to third chamber 48 and pulls fluid from second chamber 46.

Hydraulic system 41 also includes accumulator 66, check valve 70, and safety valve 72. Accumulator 66 is in fluid communication with first chamber 44 of cylinder 42 via line 54. When piston 43 of cylinder 42 is extended, for example when the boom is raised, pressurized fluid from accumulator 66 flows into first chamber 44 of cylinder 42 to provide additional energy. When piston is retracted, for example when the boom is lowered, pressurized fluid from first chamber 44 flows into accumulator 66 and is stored under pressure. Accumulator 66 conserves some the pressure or energy generated in first chamber 44 when piston 43 is retracted. In this embodiment, accumulator 66 includes a flexible bladder positioned between a compressed gas and the hydraulic fluid received from first chamber 44. It should be noted that any suitable accumulator such as a raised weight, spring type, or gas charged accumulator may be used.

Figure 4:
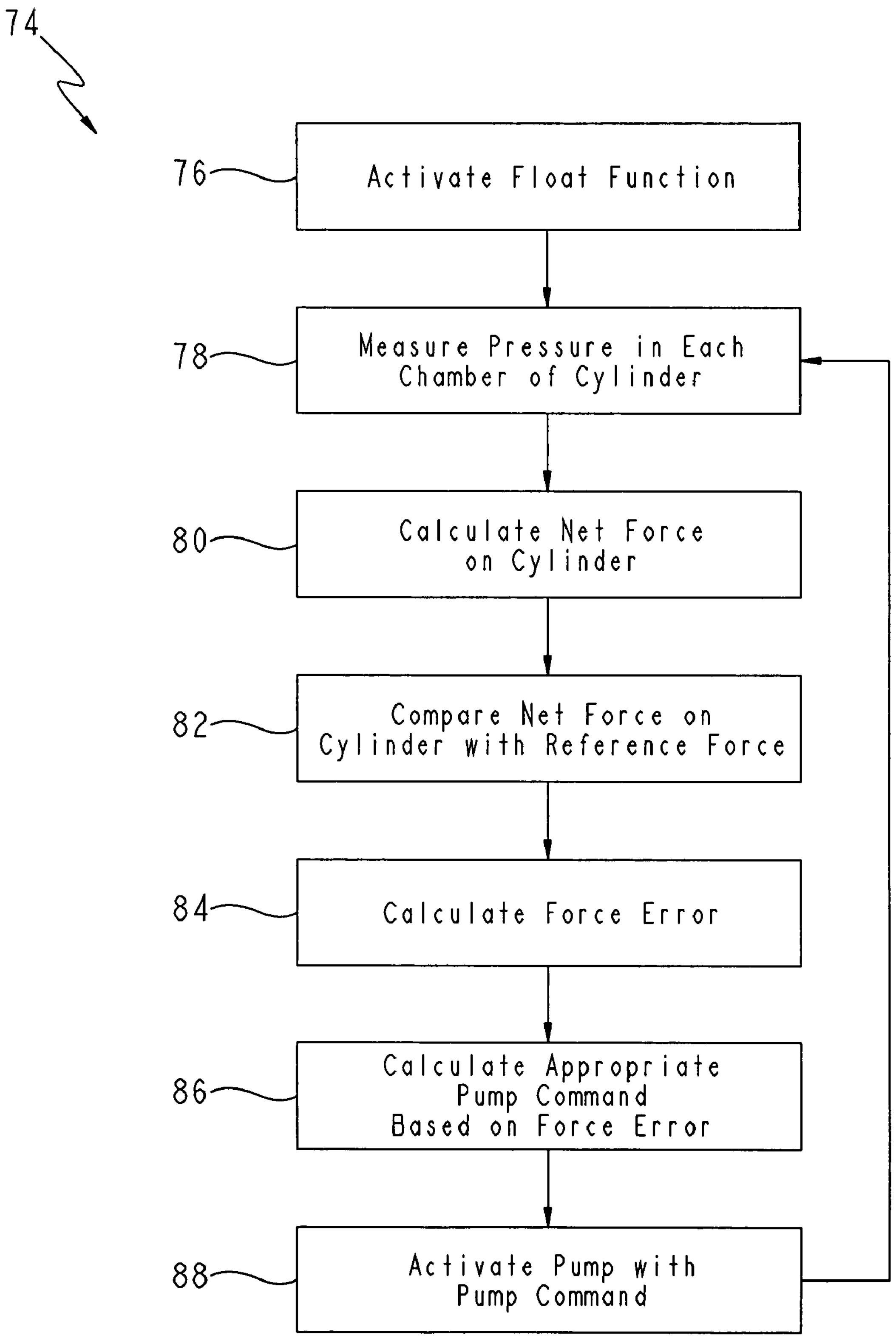
FIG. 4 is a flowchart illustrating one method of the present invention.

Referring now to FIG. 4, one embodiment of a method of controlling a float function of a hydraulic system of a loader, such as hydraulic system 41 is shown. As discussed above, the float function allows the bucket to float along the ground without receiving any additional downward pressure other than the weight of the boom assembly. Prior art float functions were difficult to use with hydraulic systems having accumulators such as hydraulic system 41, as shown in FIG. 3. Control scheme 74 may be used with any suitable hydraulic system including a three chambered boom cylinder and an accumulator. Control scheme 74 may be implemented as software used by a controller such as controller 45 to control the hydraulic system.

As an example, control scheme 74 is described using hydraulic system 41, as shown in FIG. 3. In step 76, an operator activates the float function. This may be accomplished by pressing a selector switch or moving a joystick such input 36 shown in FIG. 2 or any other suitable method. In step 78, controller measures the pressure in each of first, second, and third chambers 44, 46, and 48 of cylinder 42 using pressure sensors 60, 56, and 52. Next, in step 80 the controller calculates the net force acting on cylinder 42 using the three pressure measurements received in step 78. Specifically, the net force acting on piston 43 of cylinder 42 is determined. If the net force is positive, piston 43 of cylinder 42 will be inclined to extend. If the net force is negative, piston 43 with be inclined to retract into cylinder 42. In step 82, the controller compares the net force acting on cylinder 42 to a reference force. For a float function, the reference force is equal to zero. If the amount of force acting on the cylinder is equal to zero, the boom assembly will contact the ground having a downward pressure or force equal only to its weight and will not receive any downward pressure from cylinder 42. In other embodiments, a predetermined reference force or operator selectable reference force may be used to apply a predetermined amount of downward pressure on the boom assembly using cylinder 42.

In step 84, the force error is calculated by the controller. The force error is equal to the difference between the net force acting on the cylinder and the reference force. In step 86, the controller calculates the appropriate pump command that will move the force error closer to zero. In step 88, the pump is activated with the calculated pump command of step 86. After step 88, the scheme returns to step 78 and repeats as long the float function is activated in step 76. Control scheme 74 measures the pressure in each chamber 44, 46, and 48 of cylinder 42 and controls pump 62 so the net force acting on cylinder 42 is equal to zero to provide an automated float function for a loader.

Although the invention has been described in detail with reference to certain preferred embodiments, variations and modifications exist within the spirit and scope of the invention as described and defined in the following claims.

The invention claimed is:

1. A control system for a loader on a construction apparatus including a frame and a hydraulic pump, the loader including a boom, a bucket, and a hydraulic cylinder including at least three chambers, the cylinder operably coupled between the boom and the frame, the control system including:

a variable input configured to accept an operator instruction to float the bucket, the variable input configured to output a signal corresponding to the operator instruction;

a control valve;

an accumulator adapted to receive and store pressurized hydraulic fluid from at least one of three chambers of the hydraulic cylinder when the boom is lowered and supply pressurized hydraulic fluid to at least one of the three chambers of the hydraulic cylinder when the bucket is raised;

a plurality of pressure sensors adapted to measure a hydraulic pressure in each of the three chambers of the hydraulic cylinder and output a plurality of corresponding signals; and a controller configured to receive the signal from the variable input and control the control valve and the hydraulic pump to float the bucket based on the signal from the variable input, the controller further configured to determine a first force applied to one of the chambers of the cylinder by the accumulator and control the pump and the plurality of control valves to supply pressurized hydraulic fluid to another chamber of the cylinder to overcome the first force when the float instruction is received by the variable input.

2. The control system of claim 1, further comprising a plurality of control valves.

3. The control system of claim 1, wherein the controller is further configured to determine a net force on the cylinder and compare the net force on the cylinder to a predetermined reference force.

4. The control system of claim 3, wherein the controller is further configured to control the pump and the control valve to actuate the cylinder such that the net force on the cylinder is equal to the reference pressure.

5. The control system of claim 4, wherein the reference pressure is based on the a weight of the boom and the bucket.

6. The control system of claim 1, wherein the construction apparatus is a front-end wheel loader.

7. The control system of claim 1, wherein the float instruction is defined by the bucket resting on a ground surface.

8. A method of controlling a loader of a construction apparatus including a frame, a hydraulic pump, a hydraulic cylinder including a plurality of chambers, a plurality of pressure sensors, an accumulator, a control valve, an input, a bucket, and a boom operably coupled between the bucket and the frame, the method including the steps of:

receiving an operator input command to float the bucket;

measuring a pressure in each of the chambers of the hydraulic cylinder;

calculating a first force of the hydraulic cylinder acting on the boom to move the boom upward; and controlling the hydraulic pump and the control valve to supply hydraulic pressure to at least one of the chambers of the hydraulic cylinder to prevent the boom from moving upward.

9. The method of claim 8, wherein the calculated first force is based on the pressure in each of the chambers of the hydraulic cylinder.

10. The method of claim 9, further comprising the step of comparing the first force acting of the hydraulic cylinder to a predetermined reference force.

11. The method of claim 10, further comprising the step of calculating a force error equal to a difference between the first force and the predetermined reference force.

12. The method of claim 11, further comprising the step of calculating a pump command based on the force error.

13. The method of claim 12, wherein the pump command is configured to control the hydraulic pump and the control valve such that the force error is equal to about zero.

14. The method of claim 10, wherein the predetermined reference force is based on a weight of the boom and bucket.

15. The method of claim 8, wherein the float command is defined by resting the bucket on a ground surface.

16. The method of claim 8, further comprising the step of calculating a pump command corresponding to the hydraulic pressure required to prevent the boom from moving upward.

17. The method of claim 16, further comprising the step of activating the pump with the pump command.

18. The control system of claim 1, wherein the variable input includes discrete raise, lower, and float operator inputs.

19. The method of claim 8, wherein the operator input command includes discrete raise, lower, and float commands.

* * * * *